United States Patent [19]
Hart

[11] Patent Number: 5,054,226
[45] Date of Patent: Oct. 8, 1991

[54] UNIVERSAL BAIT HOLDER

[76] Inventor: Michael F. Hart, 1009 Park Dr., Grand Forks, N. Dak. 58201

[21] Appl. No.: 483,578

[22] Filed: Feb. 22, 1990

[51] Int. Cl.⁵ ............................................. A01K 97/00
[52] U.S. Cl. ....................................... 43/4; 294/16; 81/419
[58] Field of Search ........................ 43/4, 5; 294/16; 81/419, 417, 302; 24/501, 507, 509, 510, 511, 566, 567; 606/151, 157, 158

[56] References Cited

U.S. PATENT DOCUMENTS

| | | | |
|---|---|---|---|
| 211,357 | 1/1879 | Turner | 24/509 |
| 520,212 | 5/1894 | McKenzie | 81/419 |
| 1,095,054 | 4/1914 | Wiesenfeld | 81/419 |
| 1,484,100 | 2/1924 | Wertz | 81/419 |
| 1,634,856 | 7/1927 | Skroch . | |
| 1,699,037 | 1/1929 | Whitmore | 24/501 |
| 1,992,023 | 2/1935 | Cahn | 24/507 |
| 2,082,754 | 6/1937 | Peterson . | |
| 2,480,924 | 9/1949 | Heger . | |
| 2,502,816 | 4/1950 | Bennek . | |
| 2,531,551 | 11/1950 | Brecht et al. . | |
| 2,611,982 | 9/1952 | Sears . | |
| 2,634,159 | 4/1953 | Agneberg . | |
| 2,670,557 | 3/1954 | Pachner . | |
| 2,718,893 | 9/1955 | Wagner | 24/507 |
| 2,748,437 | 6/1956 | Dold | 24/501 |
| 2,839,325 | 6/1958 | Jeanfavre . | |
| 2,857,705 | 10/1958 | Woodcock . | |
| 2,867,882 | 1/1959 | Moore | 24/507 |
| 2,883,783 | 4/1959 | Del Matter . | |
| 2,885,814 | 5/1959 | Schlador . | |
| 2,929,166 | 3/1960 | Sneide . | |
| 3,059,369 | 10/1962 | Swanson . | |
| 3,065,561 | 11/1962 | Swanson . | |
| 3,753,308 | 8/1973 | Swanson . | |
| 4,060,923 | 12/1977 | Schmitz . | |
| 4,843,753 | 7/1989 | Mace . | |

Primary Examiner—Richard K. Seidel
Assistant Examiner—James Miner
Attorney, Agent, or Firm—Hill, Van Santen, Steadman & Simpson

[57] ABSTRACT

A device for securing and holding live bait while it is applied to a fish hook. The bait holder is comprised of two sets of opposed slender fingers which mesh together without harm or injury to the bait. The fingers are curved to present concave surfaces towards the opposed set to center and position the bait for complete access to all portions of the bait for hook applying purposes.

16 Claims, 2 Drawing Sheets

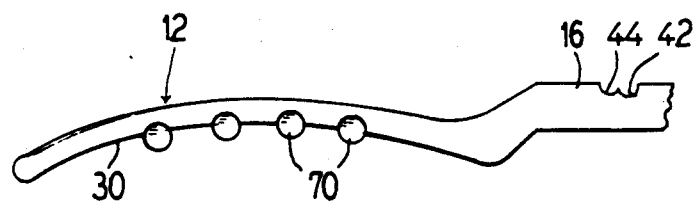
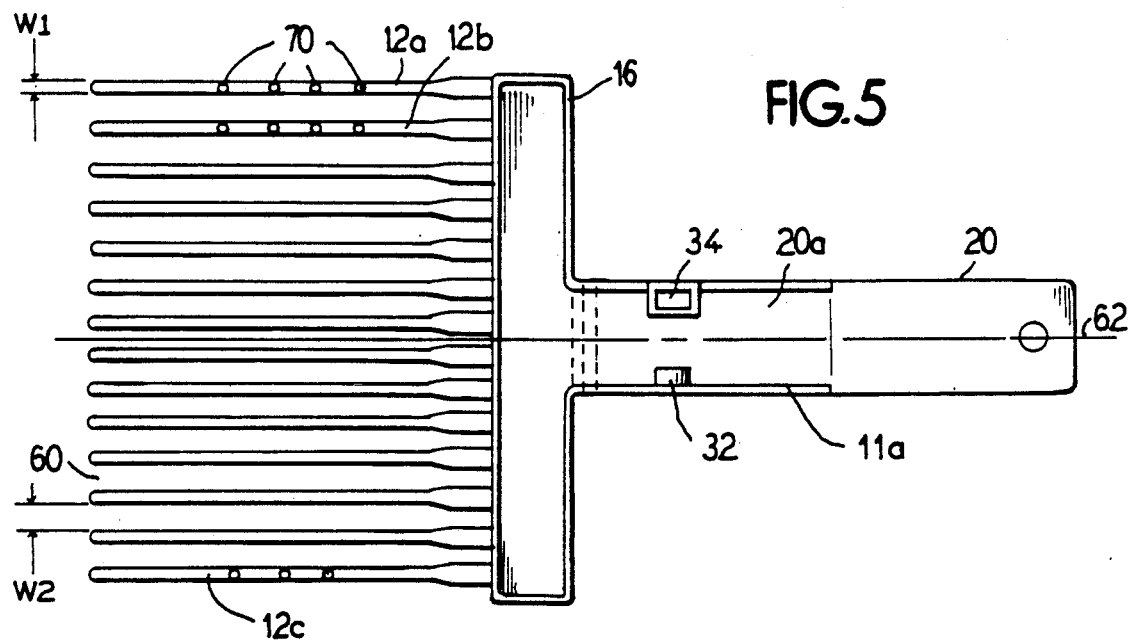

UNIVERSAL BAIT HOLDER

BACKGROUND OF THE INVENTION

The present invention relates to holders for fishing bait and more particularly to a bait holder which can be utilized to pick up a wide variety of types of bait from their storage container and to hold such bait while a hook is being applied to the bait.

Bait holders are available in many different configurations and are useful to catch a live bait from a container and hold it securely until it is applied to a fish hook. For some people, baiting the hook can be the most difficult part of fishing. In cold weather this can be even more difficult in that it is often necessary for the fisherman to put his hands into cold water and then with wet, cold and numb fingers try to hold a squirming, wiggling bait while also trying to put it on a fish hook.

Presently available bait holders are designed specifically for an individual type of bait. For example, U.S. Pat. Nos. 2,611,982; 3,059,369; 3,065,561 and 3,753,308 are specifically directed to holding minnows, U.S. Pat. No. 2,857,705 is specifically directed to holding roaches and crickets and U.S. Pat. Nos. 2,885,814 and 2,929,166 are specifically directed to holding worms. None of the above mentioned bait holders would be appropriate or useful in attempting to hold a different type of bait than that which the holder was specifically designed to hold.

SUMMARY OF THE INVENTION

The present invention provides a universal bait holder which can be utilized to grasp a bait from a container and hold that bait during the process of applying a hook to the bait. The universal bait holder of the present invention can be utilized to hold a wide variety of bait including such diverse bait as minnows, worms, leaches, roaches, grasshoppers, crickets, crawfish, salamanders, frogs and shrimp. Other types of bait could be effectively held by the herein disclosed bait holder as well.

The universal bait holder of the present invention provides the valuable function of preventing contact between the fisherman's fingers and the bait. This is valuable in that this prevents human or other odors from the fisherman's hands to be transferred to the bait. This also prevents the fisherman's fingers from removing slime or other natural odors from the bait. Various studies have shown that odor plays a big part of a bait attracting fish thus if the entire bait retrieval process and hooking process can occur without contact between the fisherman's fingers and the bait, fishing success should be enhanced.

The present universal bait holder provides the above functions without harm or injury to the live bait, other than the bait being pierced with the fish hook. The pressure points between the presently described universal bait holder and the bait are greatly reduced in comparison to those pressure points which result when the bait is handled by hand, thus the bait will be in better condition once the fish hook is applied than without use of the bait holder.

The bait holder of the present invention utilizes a pair of opposed sets of thin flexible fingers, which sets are offset from one another such that the individual fingers mesh. The fingers are biased towards one another by a selectively adjustable biasing arrangement so that the bait will be securely held between the two sets of opposed fingers. The fingers are curved along their length so as to present a concave surface toward the bait holding area to assure an enhanced gripping and a centering of the bait. Further, the flexible nature of the fingers results in a contouring of the fingers to the particular bait being held. This further assures that a wide variety of types of bait as well as a wide variety of sizes of individual types of bait will be securely held by the disclosed bait holder. For example, the present invention has been utilized in holding minnows which range in size from less than an inch long to more than six inches long and also on a wide variety of types of bait including long slender bait such as worms and leaches as well as short and wider bait such as frogs.

The selectively adjustable biasing arrangement, in a preferred embodiment, comprises a selectable number of springs which can be positioned on the finger side of a pivot point to draw the fingers together. Manual engagement areas adjacent to a base of the fingers in the location of the springs is also provided in the event the user wishes to apply additional force urging the fingers together. A lever arm extends away from the pivot point opposite the fingers to permit selective opening of the bait holder to permit engaging or releasing the bait.

In an embodiment of the invention gripping knobs are provided on the outermost fingers to provide an additional measure of assuring that the bait will be securely retained by the bait holder. Preferably each set of fingers has one set of gripping knobs on a last finger on one side and a set of gripping knobs on the last two fingers on an opposite side such that when the fingers are intermeshed, two sets of three point gripping arrangements will be provided to securely grasp the bait.

BRIEF DESCRIPTION OF THE DRAWINGS

FIG. 4 is an enlarged detail view of a portion of the bait holder.

FIG. 5 is an elevational view of the engaging side of the bait holder member taken generally along the line V—V of FIG. 3.

DETAILED DESCRIPTION OF THE PREFERRED EMBODIMENTS

Figure 1:
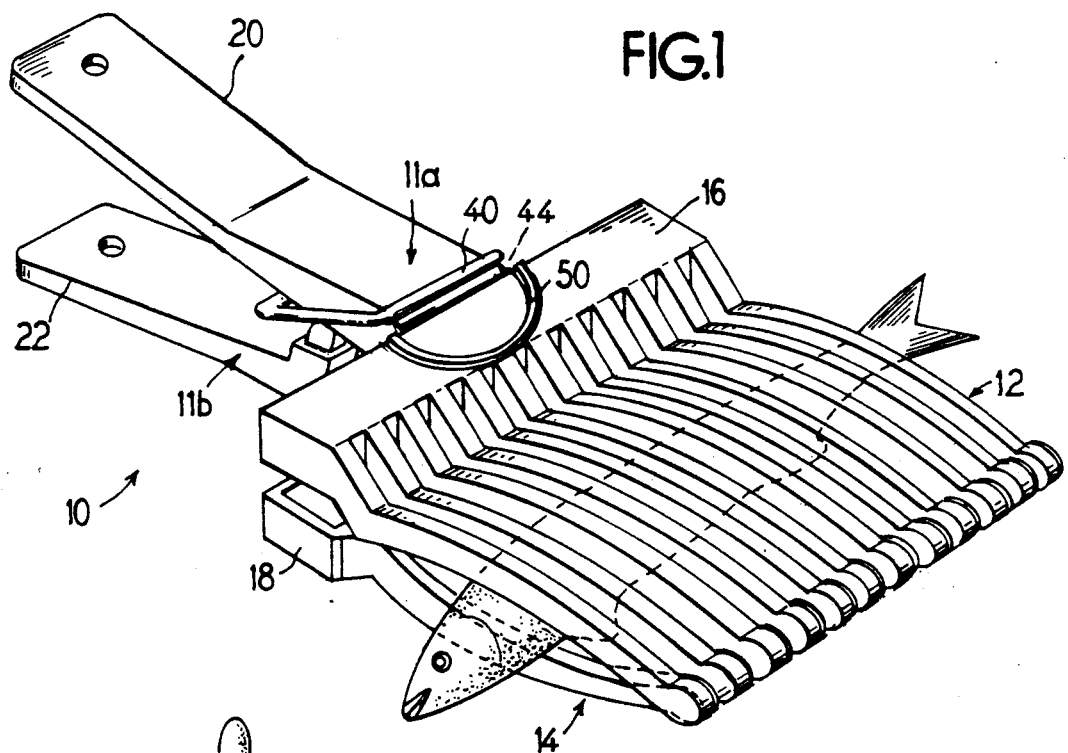
FIG. 1 is a perspective view of the universal bait holder embodying the principles of the present invention.
Figure 2:
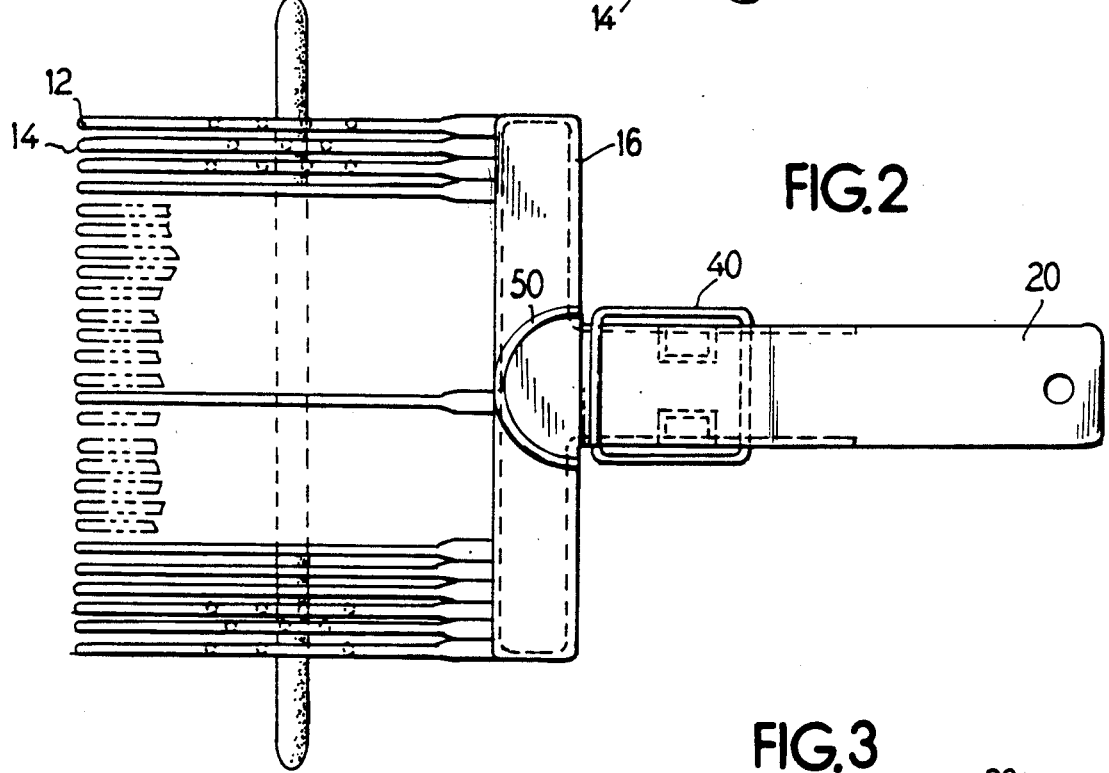
FIG. 2 is a plan view of the bait holder of FIG. 1.

While the invention is illustrated in the drawings as showing the preferred embodiment which is in the form of a clip, Applicant does not intend to limit the scope of the invention to the particular embodiment illustrated but rather shows this particular embodiment as a feasible arrangement for incorporating the invention. Other arrangements incorporating Applicant's invention will become apparent to those skilled in the art.

In the drawings there is illustrated a bait holder generally at 10 which comprises two members 11A, 11B, each having a pair of opposed sets of flexible fingers 12, 14. Each set of fingers 12, 14 is preferably integrally formed projecting lever from a lateral bar 16, 18 which has a projecting handle 20, 22 extending from the bar 16, 18 in a direction opposite that of the fingers 12, 14.

Figure 3:
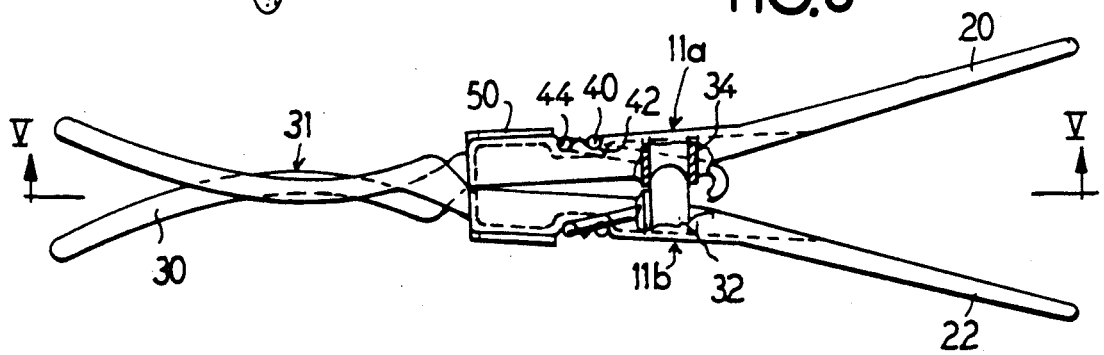
FIG. 3 is a side elevational view of the bait holder of FIG. 1.

The two members with their opposed fingers, integral lateral bars and handles are identically formed and when they are arranged face to face, present the appearance as shown in FIGS. 1 and 3. Thus, description of the invention and the particular embodiment described herein will be made with respect to a single one of the sets in some instances, it being understood that the same description pertains to the other member.

Each of the fingers 12 comprises a relatively thin and elongated member having a curved shape being concave on a facing side 30 thereof. The concave shape will assist in drawing the bait to a center 31 of the fingers which will help prevent the bait from escaping from the grasp of the fingers 12. This is also especially helpful when the bait holder is being used to retrieve a bait from a container in that the bait holder 10 will not have to be positioned precisely relative to the bait but rather will only have to have the bait somewhere interior of the concave portion of the fingers such that when the fingers are moved together, the bait will automatically be drawn to the center 31 of the bait holder fingers.

The facing side 30 of the handle portion 20 contains a pair of pivot locations 32, 34, one pivot location 32 being a projection while the other pivot location 34 is a recess. When the two identical members 11A, 11B are placed together facing each other, the projection 32 of one will mate with the recess 34 of the other to provide the necessary pivoting action.

A biasing member 40 such as a spring can be secured in a groove 42 in the members to cause the fingers to be biased towards each other. In the event that additional biasing force is required, such as for larger bait, a second spring can be selectively added to the device and held in a second groove 44. Thus, the biasing force can be selectively adjusted. Further, if still further biasing force is determined to be desireable or necessary, or if such force is only temporarily needed without installing the second optional spring, the fisherman's finger and thumb can be placed forward of the pivots 32, 34 (toward the fingers). A ridge 50 is provided on the bar 16 for receipt of the thumb and finger to prevent them from slipping off of the bar. Therefore, in this additional manner, the biasing of the fingers can be selectively adjusted.

The fingers 12 are spaced along the length of the bar 16 at equal intervals such that gaps 60 are provided between adjacent fingers. The fingers are offset from a centerline 62 of the member 11A such that when the two members are placed together face to face, the fingers mesh together with the fingers of one set falling in the gaps between the fingers of the other set. A width W1 of the fingers is less than a width W2 of the gaps such that spaces will remain between the fingers after they have been closed together to allow the room necessary to insert a fish hook into the gap between the fingers. In this manner, access to any part of the bait's body with the fish hook as it is immobilized with the bait holder will be possible. Further, with the concave shape of the fingers, not only does this bring the bait to the center of the finger portion, it also automatically brings the bait to a 90° angle relative to the length of the fingers. This right angle provides access along the entire length of the bait's body by the fish hook. Further, this right angle allows the pressure of the flexible fingers to be distributed evenly across and contouring to the entire body of the bait so as to allow the least amount of stress on the bait.

Optionally a plurality of gripping knobs 70 are provided on some of the outer fingers on each member to provide an enhanced gripping of the bait. Specifically, four such knobs may be provided on the last two fingers 12A, 12B at one lateral side of the member and three gripping knobs may be provided on the last one finger 12C at the other lateral side of the member. When the two members are placed face to face the last finger 12C will mesh between the last two fingers 12A, 12B of the opposing member, thus providing a three point gripping at each lateral end of the bait holder 10. Further, the spacing of the three knobs on the one end finger 12C will be interposed between the two sets of four knobs on the last two fingers 12A and 12B of the opposing set.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A universal bait holder comprising:
   a first set of parallel fingers, said fingers being held at a predetermined spacing relative to one another;
   a second set of parallel fingers, said fingers of said second set being held at a predetermined spacing relative to one another;
   said second set of fingers being arranged to oppose said first set of fingers;
   each of said fingers being flexible and having a curvature so as to present a concave surface towards said opposed set of fingers;
   surface means for accepting a biasing force; biasing force means for urging said two sets of fingers towards each other about a pivot axis perpendicular to a length of said fingers such that said fingers mesh; and
   means for receiving an opening force for overcoming said biasing force to effect selected movement of said two sets of fingers away from each other.

2. A universal bait holder according to claim 1, wherein each set of fingers is mounted at one end to an integral bar and said bar includes a pivot means to permit said sets of fingers to pivot thereabout such that said fingers will completely intermesh when no bait is interposed between said sets of fingers.

3. A universal bait holder according to claim 1, wherein said fingers are elongated and flexible so as to be able to grasp a bait for removal from a container.

4. A universal bait holder according to claim 1, wherein said first and second sets of fingers are identical.

5. A universal bait holder according to claim 1, wherein said biasing force means comprises a spring extending between said two sets of fingers.

6. A universal bait holder according to claim 1, wherein said surface means is adapted to accept a selectively variable biasing force.

7. A universal bait holder according to claim 6, wherein said surface means comprises grooves for receiving a selectable number of springs.

8. A universal bait holder according to claim 6, wherein said surface means comprises a manually engageable area with a stop wall to prevent slippage of a user's fingers.

9. A universal bait holder according to claim 1, wherein a plurality of said fingers include gripping knobs formed on a side of said fingers facing toward said opposed set for engaging a bait.

10. A universal bait holder according to claim 9, wherein said knobs provide a plurality of three point grips at each lateral end of the bait holder.

11. A universal bait holder comprising:
   a pair of identically formed members, said members each having a set of spaced fingers projecting from one end and pivot means thereon for engaging with the pivot means of the other member in an opposed manner;
   said fingers having a curved shape so as to present a concave surface toward the opposed set;
   said fingers having a width less than a spacing between said fingers so as to permit opposed sets of fingers to mesh.

12. A universal bait holder according to claim 11, including means for biasing the sets of fingers of said two members towards each other.

13. A universal bait holder according to claim 12, wherein said means for biasing comprises a spring extending between said two members.

14. A universal bait holder according to claim 11, wherein a plurality of said fingers include gripping knobs formed on a side of said fingers facing toward said opposed set for engaging a bait.

15. A universal bait holder comprising:
   a pair of identically formed members;
   each member comprising a central lateral bar having a set of parallel, spaced fingers projecting from one side thereof and handle projecting from an opposite side thereof;
   said fingers being relatively thin and elongated and being spaced apart a distance greater than a width of said fingers, said fingers further being flexible and have a curved shape so as to present a concave surface on one side thereof;
   said handles having pivot means formed on one side thereof for engaging with the pivot means of the other member in an opposed manner; and
   a spring extending between said two members in their engaged position to urge the opposing sets of fingers towards each other.

16. A universal bait holder according to claim 15, wherein a plurality of said fingers include gripping knobs formed on a side of said fingers facing toward said opposed set for engaging a bait.

* * * * *